United States Patent [19]
Belt

[11] Patent Number: 5,734,767
[45] Date of Patent: Mar. 31, 1998

[54] FIBER OPTIC COUPLER

[76] Inventor: Richard W. Belt, 1190 Hillcrest Rd., Odenton, Md. 31113

[21] Appl. No.: 678,667

[22] Filed: Jul. 11, 1996

[51] Int. Cl.[6] .................................................... G02B 6/38
[52] U.S. Cl. ........................................ 385/51; 385/99
[58] Field of Search ............................ 385/51, 95–99, 385/55, 135

[56] References Cited

U.S. PATENT DOCUMENTS

| | | | |
|---|---|---|---|
| 4,580,874 | 4/1986 | Winter et al. | 350/96.21 |
| 4,647,150 | 3/1987 | DEsAnti et al. | 350/96.21 |
| 4,746,189 | 5/1988 | Arrington et al. | 350/96.21 |
| 4,810,277 | 3/1989 | Wait et al. | 350/96.21 |
| 4,863,234 | 9/1989 | Gladenbeck et al. | 350/96.21 |
| 4,931,076 | 6/1990 | Berkey | 65/4.2 |
| 5,066,095 | 11/1991 | Dekeyser et al. | 385/99 |
| 5,222,176 | 6/1993 | Webber et al. | 385/99 |
| 5,285,512 | 2/1994 | Duncan et al. | 385/94 |
| 5,479,548 | 12/1995 | Cote et al. | 385/51 |
| 5,500,917 | 3/1996 | Daniel et al. | 385/99 |
| 5,533,161 | 7/1996 | Atkeisson et al. | 385/99 |

FOREIGN PATENT DOCUMENTS

| | | | |
|---|---|---|---|
| 52-30448 | 3/1977 | Japan | 385/99 |
| 60-21010 | 2/1985 | Japan | 385/99 |
| WO 90/01175 | 2/1990 | WIPO | 385/99 |

*Primary Examiner*—John Ngo
*Attorney, Agent, or Firm*—Rhodes Coates & Bennett, L.L.P.

[57] ABSTRACT

A hermetically sealed fiber optic coupler for packaging end joined optical fibers. The device includes at least one first optical fiber having a glass-based portion having a first free end and a second optical fiber having a glass-based portion having a second free end joined to the first free end of the glass-based portion of the first optical fiber to form an end joint. The device further includes an outer chamber having at least one open end, the outer chamber surrounding the end joint, the outer chamber and the end joint being hermetically sealed with a thermosetting plastic. In the preferred embodiment, the device also includes a primary tubular sleeve, positioned between the end joint the outer chamber; epoxy for tacking the glass-based portions of the first and second optical fibers to the primary tubular sleeve; and thixotropic epoxy for hermetically sealing the ends of the primary tubular sleeve.

28 Claims, 3 Drawing Sheets

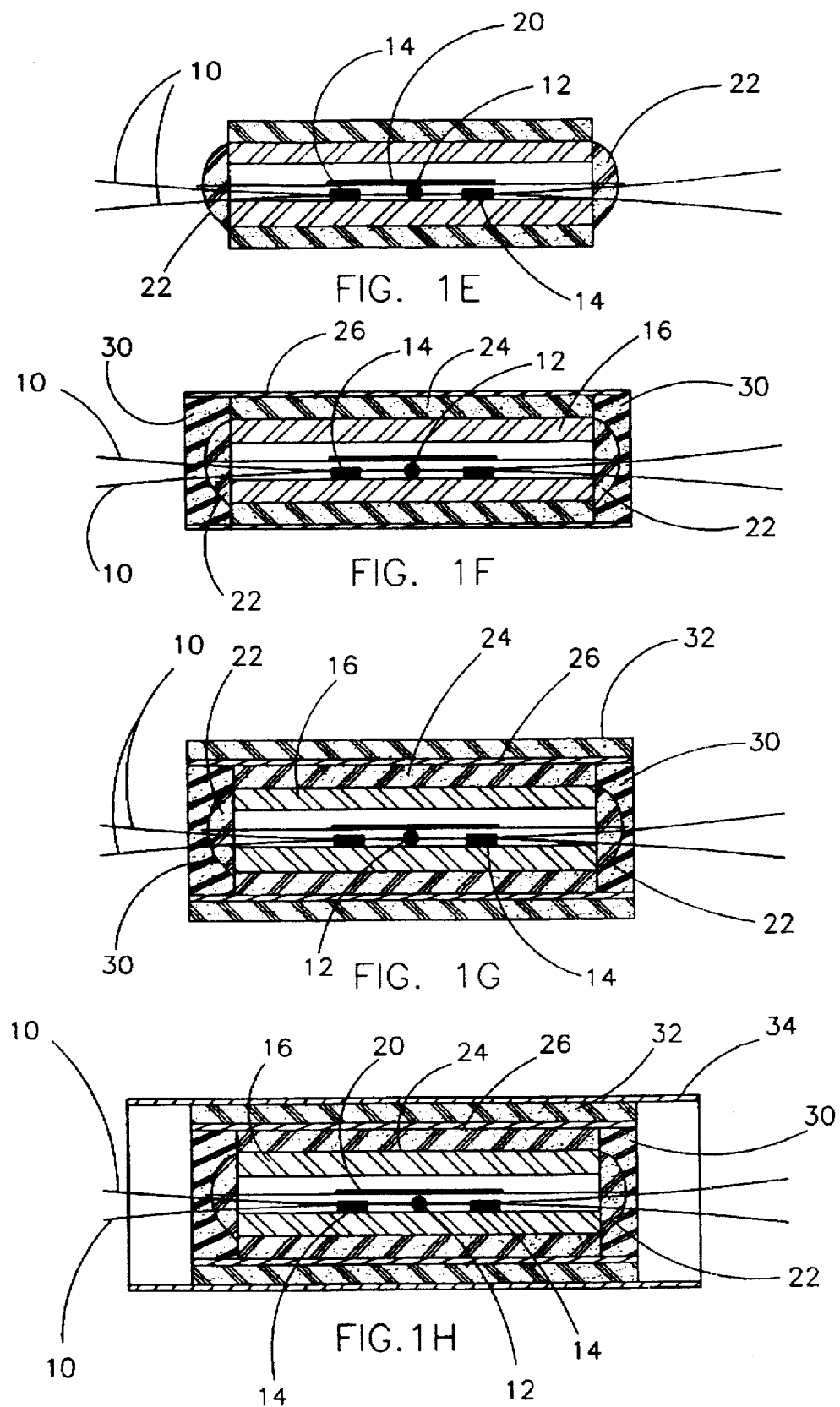

FIBER OPTIC COUPLER

BACKGROUND OF THE INVENTION

(1) Field of the Invention

The present invention relates generally to optical fibers, fiber optic components and devices and, more particularly, to a hermetically sealed and packaged fiber optic coupler/splitter.

(2) Description of the Prior Art

Over the last 15 years, a number of fiber optic components and devices such as: couplers, attenuators, wavelength division multiplexers/de-multiplexers, connectors, filters, switches, fiber-pigtailed semiconductor lasers, isolators, etc., have been developed for use in fiber optic communication systems, sensors and instrumentation. In nearly all of these applications employing fiber optic components or devices, design specific mounting fixtures are utilized to precisely align, position or secure optical fibers or elements within such optical fiber components or devices. In most of these applications, it is common for such mounting fixtures to be formed of a fused silica material because its low coefficient of thermal expansion closely matches that of the optical fibers and other optical components or devices. In this respect, maintaining the stability and relative position of optical fibers, components or devices, through the correct choice of materials, is particularly critical in that even minor relative movements between such elements may result in large variations or degradation in optical characteristics, such as coupling ratios and insertion losses.

Optical fibers, components and devices are typically secured with epoxy adhesives. Most common types of epoxy adhesives used in these applications cure upon exposure to either UV light or heat. The epoxy adhesives are widely used because they are inexpensive, easy to use, and in many instances readily cured. Rapid in-situ cure schedules are also well suited for volume manufacturing.

While epoxies offer a convenient means for attaching optical fibers, components or devices to substrates or to other optical fibers, components or devices, the physical properties of cured epoxies often make such materials less than ideally suited for use in fiber optic systems. In one respect, epoxies have a tendency to absorb moisture. Such tendency is detrimental in that moisture significantly reduces an epoxy's ability to firmly secure the optical fiber, optical components or devices, or to a substrate. In addition, the cured epoxy swells as it absorbs water vapor, and this swelling may strain the relative attachment between optical fibers, or optical components, or optical devices or to a supporting substrate. In general, moisture induced swelling and subsequent degradation of the epoxy adhesive may cause misalignment or even detachment of the optical fibers, components or devices relative to a supporting substrate or other optical elements.

As fiber optics continue to penetrate the telecommunications market, product lifetimes of 20 years or more will be mandatory. In order to achieve this degree of performance, new packaging techniques and materials will be required for reliably attaching optical fibers, components, or devices to supporting substrates and to each other.

U.S. Pat. No. 5,500,917, issued to Hani et al., discloses a method of bonding glass-based optical elements, comprising the steps of positioning a first glass-based optical element relative to a second glass-based optical element, applying a glass-based bonding compound about the first and second optical elements, and applying sufficient localized heat to the glass-based bonding compound to cause the glass-based bonding compound to soften and fuse with the optical elements.

U.S. Pat. No. 5,285,512, issued to Duncan et al., discloses a hybrid fiber optic transceiver which includes a transmitter for converting electrical data signals to corresponding light energy, a receiver for converting optical data signals back to electrical data signals and a clock recovery mechanism to maintain the electrical data signals outputs from the receiver in their proper order. The transceiver also includes an optical splitter or coupler that allows light signals to be transmitted and received over a single fiber. The opto-electrical hybrid circuitry of the transceiver and the fiber optic coupler are enclosed in a small light weight package which is hermetically sealed.

U.S. Pat. No. 4,931,076, issued to Berkey, a method of making an economical fiber coupler comprises providing a glass tube having first and second end portions and a midregion, and a longitudinal aperture extending therethrough. Two suitably prepared glass optical fibers, each having a core and cladding, are disposed within the longitudinal aperture, the fibers extending beyond each end thereof. The fibers are held taut to effect a tension therein, and they are glued to each end portion. The midregion of the member is heated, collapsed about the fibers, and drawn to reduce the diameter thereof.

Still, there remains a need for a new and improved fiber optic coupler which is capable of achieving a product lifetime of twenty years or more. This improved coupler must be sufficiently sealed in order to repel moisture and avoid swelling due to the absorption of such moisture.

SUMMARY OF THE INVENTION

The present invention is directed to a hermetically sealed fiber optic coupler for packaging end joined optical fibers. The device includes at least one first optical fiber having a glass-based portion having a first free end and a second optical fiber having a glass-based portion having a second free end joined to the first free end of the glass-based portion of the first optical fiber to form an end joint.

The device further includes an outer chamber having at least one open end, the outer chamber surrounding the end joint, the outer chamber and the end joint being hermetically sealed with a thermosetting plastic.

In the preferred embodiment, the device also includes a primary tubular sleeve, positioned between the end joint the outer chamber; epoxy for tacking the glass-based portions of the first and second optical fibers to the primary tubular sleeve; and thixotropic epoxy for hermetically sealing the ends of the primary tubular sleeve.

Accordingly, one aspect of the present invention is to provide a hermetically sealed fiber optic coupler for packaging end joined optical fibers, the device including: (a) at least one first optical fiber having a glass-based portion having a first free end; (b) a second optical fiber having a glass-based portion having a second free end joined to the first free end of the glass-based portion of the first optical fiber to form an end joint; and (c) an outer chamber having at least one open end, the outer chamber surrounding the end joint, the outer chamber and the end joint being hermetically sealed.

Another aspect of the present invention is to provide a hermetically sealed chamber for a fiber optic coupler for packaging end fused optical fibers having at least one first optical fiber having a glass-based portion having a first free end; and a second optical fiber having a glass-based portion having a second free end joined to the first free end of the glass-based portion of the first optical fiber to form an end joint, the device including: an outer chamber having at least one open end, the outer chamber surrounding the end joint, the outer chamber and the end joint being hermetically sealed with a thermosetting plastic.

Still another aspect of the present invention is to provide a hermetically sealed fiber optic coupler for packaging end joined optical fibers, the device including: (a) at least one first optical fiber having a glass-based portion having a first free end; (b) a second optical fiber having a glass-based portion having a second free end joined to the first free end of the glass-based portion of the first optical fiber to form an end joint; (c) an outer chamber having at least one open end, the outer chamber surrounding the end joint, the outer chamber and the end joint being hermetically sealed with a thermosetting plastic; and (d) a primary tubular sleeve, positioned between the end joint the outer chamber; means for tacking the glass-based portions of the first and second optical fibers to the primary tubular sleeve; and means for hermetically sealing the ends of the primary tubular sleeve.

These and other aspects of the present invention will become apparent to those skilled in the art after a reading of the following description of the preferred embodiment when considered with the drawings.

BRIEF DESCRIPTION OF THE DRAWINGS

FIGS. 1A–1J are sequence of diagrams illustrating the method for constructing a hermetically sealed fiber optic coupler package according to the present invention.

DESCRIPTION OF THE PREFERRED EMBODIMENTS

Figure 1A:
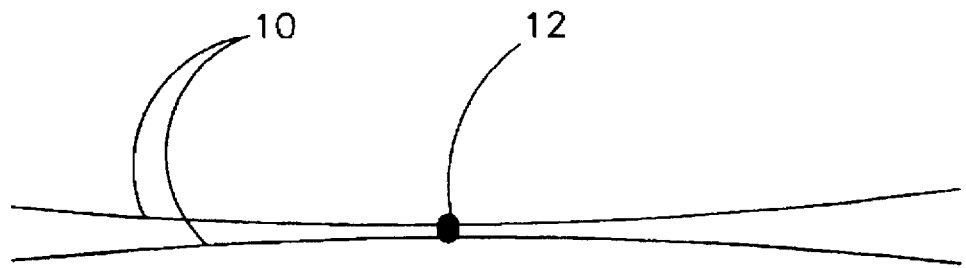

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and FIG. 1A in particular, it will be understood that the illustrations are for the purpose of describing a preferred embodiment of the invention and are not intended to limit the invention thereto. As best seen in the Figure, the process according to the present invention begins with the fuse end bonding of two optical fibers to one another at a coupled region (FIG. 1A). Then the coupled region of the optical fibers is bonded to a central receiving substrate.

Figure 1B:
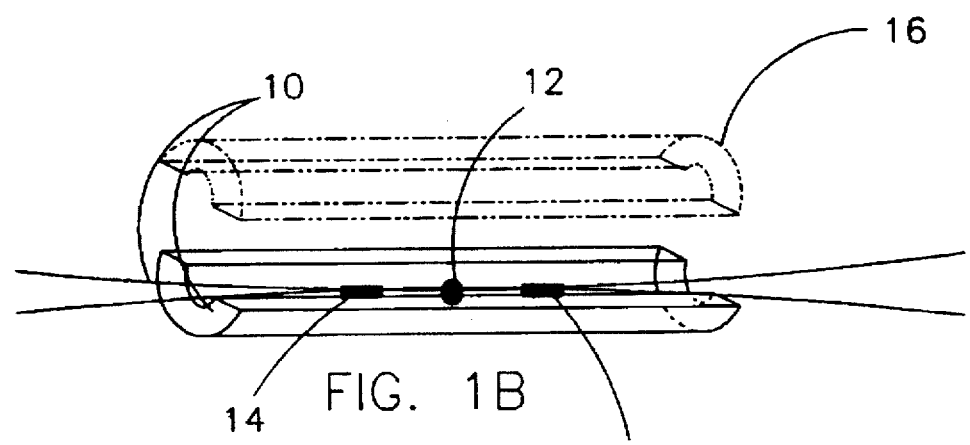
Figure 1C:
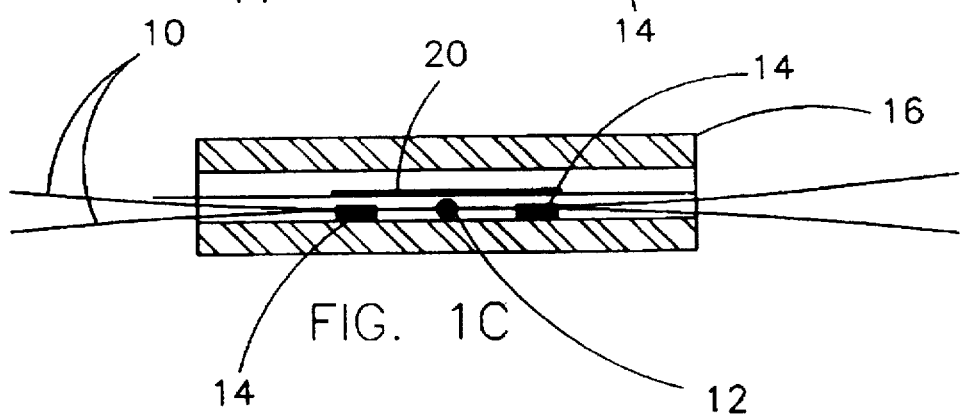
Figure 1D:
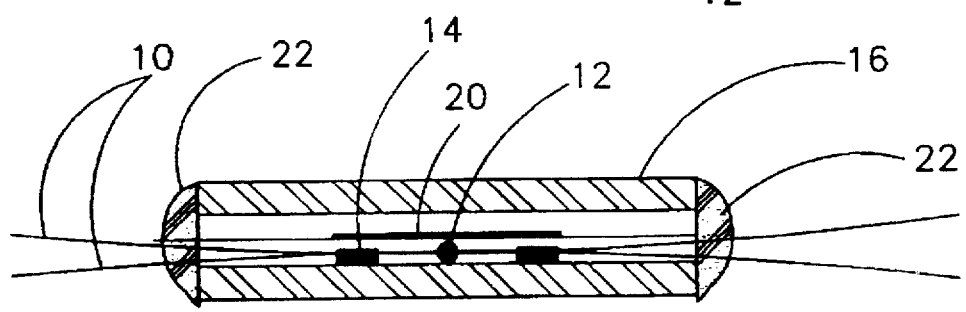

In the preferred embodiment, the central receiving substrate is a clamshell shaped neoceram (a low thermal expansion pyroceramic material) sleeve (FIG. 1B). The clamshell substrate is then placed under a microscope and the shells are cleaned, for the purpose of mating the upper and lower halves of the clamshell substrate. The upper half of the substrate is coated with 353ND thixotropic paste and carefully placed over the lower half of the substrate, FIG. 1C. The now closed neoceram cylinder is placed into a holding fixture, then cured at 100° C. for five minutes.

After cure time, the neoceram cylinder is removed from its fixture and mounted in a rotating 360° fixture, making sure there are no bends in any of the fibers. One side of the neoceram tube is then filled with 353ND thixotropic paste and cured at 120° C. for ten minutes. After cure, the stage is rotated 180° and the other end of the neoceram tube is filled with 353ND thixotropic paste. At this point, the neoceram tube is placed in a vacuum evacuation and penetration system chamber (VEPS).

The VEPSing procedure begins when the VEPS chamber is filled with nitrogen gas. The vacuum is turned on and all valves are closed to produce a vacuum. All ambient air is then drawn out of the chamber. Nitrogen is released again until the chamber has changed its volume. The valves are then closed and a vacuum is produced in the VEPS chamber. When an equal vacuum is achieved in both the VEPS chamber and the glass ceramic sleeve, the vacuum is stopped and the chamber is brought back to an ambient air pressure. As this ambient pressure is achieved, the 353ND thixotropic paste penetrates the ceramic sleeve, producing a hermetic seal.

With the VEPS procedure completed, the ceramic sleeve is removed from the chamber and placed into an oven for a cure at 120° C. for ten minutes. At this point, a primary hermetically sealed chamber is achieved. The fixture is removed from the oven and the primary chamber is encapsulated with 353ND thixotropic paste and cured. After the cure, a secondary INVAR™ tube is positioned over the primary chamber and tacked down with 353ND thixotropic paste and then cured.

After the cure, the secondary tube is filled at one end with 377 epoxy. The secondary tube is VEPSed and then cured at 150° C. After the cure, the holding stage is rotated 180° and the open end of the secondary tube is filled with 377 epoxy (FIGS. 1E and 1F). The secondary tube is again VEPSed and cured. After the cure, the secondary INVAR tube is encapsulated with 353ND thixotropic paste and cured (FIG. 1G).

Figure 1I:
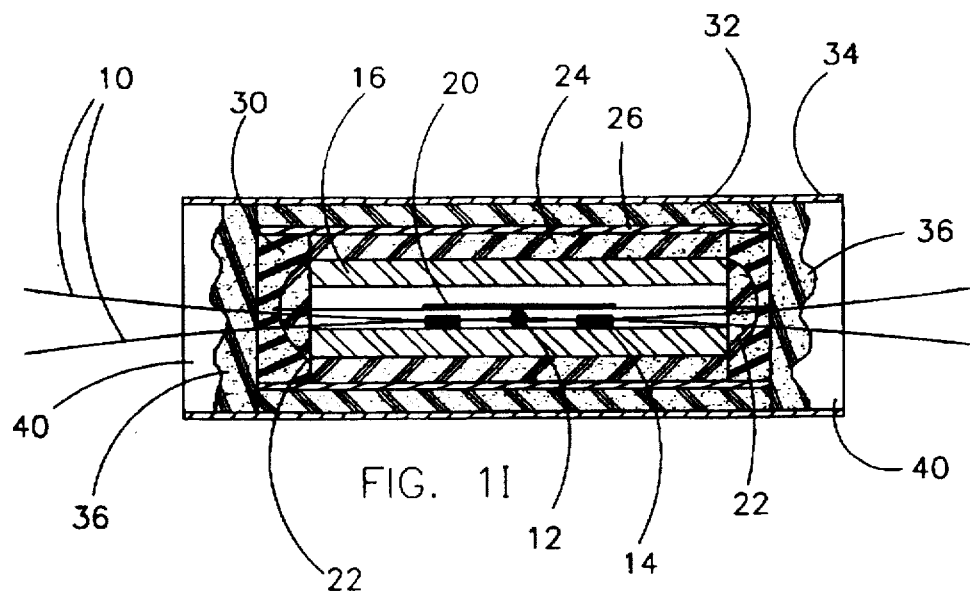

After the cure, the tertiary tube is positioned over the secondary tube encapsulation and tacked down with 353ND thixotropic paste and then cured at 120° C. (FIG. 1H). After the cure, one side of the tertiary tube is filled with 377 epoxy. The tertiary tube is VEPSed and cured. In the preferred embodiment, at least a 1.0 to 1.5 millimeter space from the top of the tertiary tube to the top of the 377 epoxy fill is left for the injection of the RTV boot material. After cure, the stage is rotated 180° and the open end of the tertiary tube is filled again with 377 epoxy, VEPSed and cured (FIG. 1I).

After this final cure process, the coupler is removed from the oven, allowed to cool, and then tested. After the coupler has proven to pass specifications, it is booted with RTV on both ends, and is allowed to cure before it is retested.

Figure 1J:
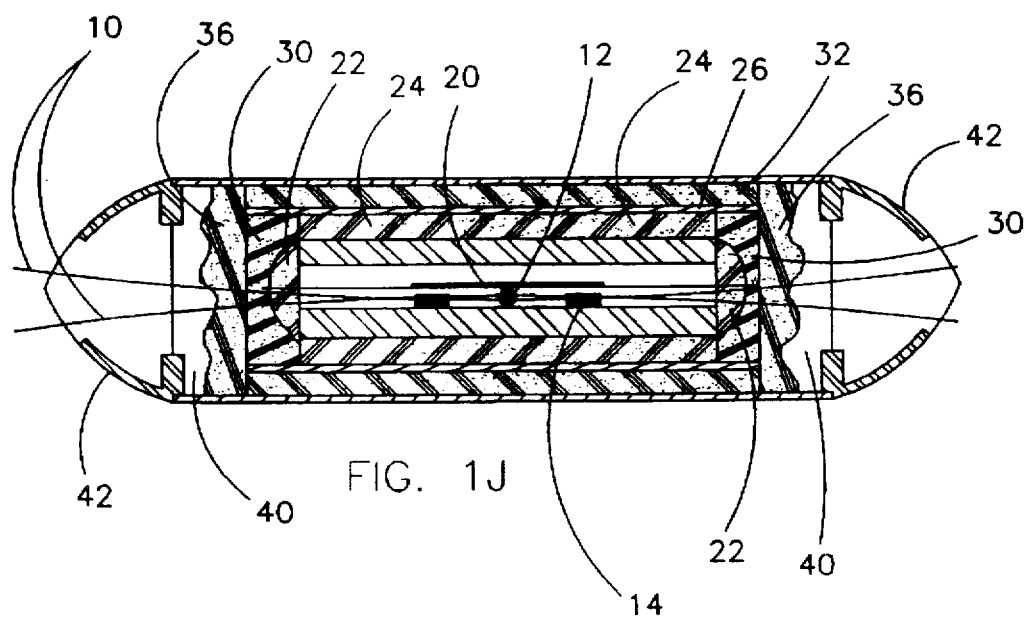

As shown in FIG. 1J, the final product constructed according to the present invention is shown. The figure shows a hermetically sealed/environment-proof fiber-optic coupler package having two fibers 10 fused together at a fused region 12 bonded to the substrate 14 of a clamshell shaped neoceram sleeve 16. The clamshell sleeve is closed and bonded, forming a primary chamber 20. Both ends of the primary chamber being filled with 353 thixotropic paste 22 and the primary chamber being encapsulated with 353ND thixotropic paste 24. The secondary seal INVAR tube 26 is positioned over the primary chamber. Both ends of the secondary tube are filled with 377 epoxy 30 and the secondary tube is encapsulated with 353ND thixotropic paste 32. A tertiary tube 34 is positioned over the secondary tube and the ends of the tertiary tube are filled with 377 epoxy 36, leaving a 1.0 to 1.5 millimeter space 40 between the top of the tertiary tube and the top of the 377 epoxy fill. Finally, RTV boots 42 are added to both ends of the coupler.

Certain modifications and improvements will occur to those skilled in the art upon a reading of the foregoing description. It should be understood that all such modifications and improvements have been deleted herein for the sake of conciseness and readability but are properly within the scope of the following claims.

I claim:

1. A hermetically sealed fiber optic coupler for packaging end joined optical fibers, said device comprising:
   (a) at least one first optical fiber having a glass-based portion having a first free end;
   (b) a second optical fiber having a glass-based portion having a second free end joined to said first free end of the glass-based portion of said first optical fiber to form an end joint; and
   (c) an outer chamber having at least one open end, said outer chamber surrounding said end joint, said outer chamber and said end joint being hermetically sealed, said outer chamber being evacuated to form a vacuum therein.

2. The device according to claim 1, further including a primary tubular sleeve forming said outer chamber; means for tacking said glass-based portions of said first and second optical fibers to said primary tubular sleeve; and means for hermetically sealing the ends of said primary tubular sleeve.

3. The device according to claim 2, wherein said primary tubular sleeve is a two piece sleeve having a longitudinal axis and which is split along its longitudinal plane, forming a clamshell shape.

4. The device according to claim 1, wherein said primary tubular sleeve is formed from a low thermal expansion material selected from the group consisting of neoceram, E-glass and Invar metal.

5. The device according to claim 1, wherein said means for tacking said glass-based portions of said first and second optical fibers to said primary tubular sleeve is selected from the group consisting of epoxy adhesive and solder.

6. The device according to claim 1, wherein said means for hermetically sealing said primary tubular sleeve and said end joint is an epoxy.

7. The device according to claim 6, wherein said means for hermetically sealing said primary tubular sleeve and said end joint is an thixotropic epoxy.

8. The device according to claim 7, wherein said thixotropic epoxy is 353ND epoxy.

9. The device according to claim 1, wherein said vacuum is between about 29.5 to 32.5 inches of Hg.

10. The device according to claim 1, further including backfilling said outer chamber with an inert gas.

11. The device according to claim 10, wherein said inert gas is nitrogen.

12. The device according to claim 11, wherein said nitrogen is at a pressure of between about 3 to 5 psi.

13. A hermetically sealed fiber optic coupler for packaging end joined optical fibers, said device comprising:
   (a) at least one first optical fiber having a glass-based portion having a first free end;
   (b) a second optical fiber having a glass-based portion having a second free end joined to said first free end of the glass-based portion of said first optical fiber to form an end joint;
   (c) an outer chamber having at least one open end, said outer chamber surrounding said end joint, said outer chamber and said end joint being hermetically sealed with a thermosetting plastic; and
   (d) a primary tubular sleeve forming said outer chamber around said end joint; means for tacking said glass-based portions of said first and second optical fibers to said primary tubular sleeve; and means for hermetically sealing the ends of said primary tubular sleeve, said primary tubular sleeve includes a two piece sleeve having a longitudinal axis and which is split along its longitudinal plane, forming a clam-shell shape.

14. The device according to claim 13, wherein said primary tubular sleeve is formed from a low thermal expansion material selected from the group consisting of neoceram, E-glass and Invar metal.

15. The device according to claim 13, wherein said means for tacking said glass-based portions of said first and second optical fibers to said primary tubular sleeve is selected from the group consisting of epoxy adhesive and solder.

16. The device according to claim 13, wherein said means for hermetically sealing said primary tubular sleeve and said end joint is an epoxy.

17. The device according to claim 16, wherein said means for hermetically sealing said primary tubular sleeve and said end joint is an thixotropic epoxy.

18. The device according to claim 17, wherein said thixotropic epoxy is 353ND epoxy.

19. The device according to claim 13, further including evacuating said outer chamber to form a vacuum.

20. The device according to claim 19, wherein said vacuum is between about 29.5 to 32.5 inches of Hg.

21. The device according to claim 19, further including backfilling said outer chamber with an inert gas.

22. The device according to claim 21, wherein said inert gas is nitrogen.

23. The device according to claim 22, wherein said nitrogen is at a pressure of between about 3 to 5 psi.

24. The device according to claim 13, wherein said thermosetting plastic for hermetically sealing said outer chamber and said end joint is an epoxy.

25. The device according to claim 24, wherein said epoxy is 377 epoxy.

26. A method for forming and hermetically sealing a fiber optic coupler for packaging end joined optical fibers, said method comprising the steps of:
   (a) positioning at least one first optical fiber having a glass-based portion having a first free end adjacent to a second optical fiber having a glass-based portion having a second free end;
   (b) forming an end joint between said first free end of the glass-based portion of said first optical fiber and said second optical fiber having a glass-based portion having a second free end;
   (c) surrounding said end joint with an outer chamber having at least one open end;
   (d) hermetically sealing said outer chamber and said end joint; and
   (e) evacuating said outer chamber to form a vacuum therein.

27. A method for forming and hermetically sealing a fiber optic coupler for packaging end joined optical fibers, said method comprising the steps of:
   (a) positioning at least one first optical fiber having a glass-based portion having a first free end adjacent to a second optical fiber having a glass-based portion having a second free end;
   (b) forming an end joint between said first free end of the glass-based portion of said first optical fiber and said second optical fiber having a glass-based portion having a second free end;
   (c) forming an outer chamber surrounding said end joint with a clam-shell shaped, two-piece sleeve, said outer chamber having at least one open end; and
   (d) hermetically sealing said outer chamber and said end joint.

28. A method for forming and hermetically sealing a fiber optic coupler for packaging end joined optical fibers, said method comprising the steps of:

(a) positioning at least one first optical fiber having a glass-based portion having a first free end adjacent to a second optical fiber having a glass-based portion having a second free end;

(b) forming an end joint between said first free end of the glass-based portion of said first optical fiber and said second optical fiber having a glass-based portion having a second free end;

(c) positioning a primary tubular sleeve around said end joint;

(d) tacking said glass-based portions of said first and second optical fibers to said primary tubular sleeve;

(e) hermetically sealing the ends of said primary tubular sleeve with a thermosetting plastic;

(f) surrounding said primary tubular sleeve and end joint with an outer chamber having at least one open end;

(g) hermetically sealing said outer chamber and said end joint with a thermosetting plastic; and (h) evacuating said outer chamber to form a vacuum therein.

* * * * *

UNITED STATES PATENT AND TRADEMARK OFFICE
CERTIFICATE OF CORRECTION

PATENT NO. : 5,734,767
DATED : March 31, 1998
INVENTOR(S) : Richard W. Belt

It is certified that error appears in the above-indentified patent and that said Letters Patent is hereby corrected as shown below:

In Claim 2, line 2, change "forming" to --within--.

In Claim 13, line 13, change "forming" to --within--.

Signed and Sealed this

Fourth Day of August, 1998

Attest:

BRUCE LEHMAN

Attesting Officer

Commissioner of Patents and Trademarks